United States Patent
Long et al.

(10) Patent No.: US 10,972,438 B2
(45) Date of Patent: Apr. 6, 2021

(54) METHOD FOR ENCRYPTED CALL AND TERMINAL

(71) Applicant: Huawei Technologies Co., Ltd., Shenzhen (CN)

(72) Inventors: Shuiping Long, Beijing (CN); Chan Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 300 days.

(21) Appl. No.: 15/745,027

(22) PCT Filed: Aug. 27, 2015

(86) PCT No.: PCT/CN2015/088235
§ 371 (c)(1),
(2) Date: Jan. 15, 2018

(87) PCT Pub. No.: WO2017/031744
PCT Pub. Date: Mar. 2, 2017

(65) Prior Publication Data
US 2018/0205562 A1 Jul. 19, 2018

(51) Int. Cl.
*H04L 29/06* (2006.01)
*H04W 12/00* (2021.01)
(Continued)

(52) U.S. Cl.
CPC .......... *H04L 63/04* (2013.01); *H04L 9/0841* (2013.01); *H04L 9/3273* (2013.01); *H04L 12/50* (2013.01);
(Continued)

(58) Field of Classification Search
CPC ....... H04L 9/3273; H04L 63/04; H04L 63/06; H04L 9/0841; H04L 12/50; H04W 12/02; H04W 12/04; H04M 3/205
See application file for complete search history.

(56) References Cited

U.S. PATENT DOCUMENTS 6,222,924 B1* 4/2001 Salomaki ............... H04N 7/163
348/E7.056
7,596,224 B2* 9/2009 Klug ....................... H04K 1/00
380/270
(Continued)

FOREIGN PATENT DOCUMENTS

CN 101014159 A 8/2007
CN 101183935 A 5/2008
(Continued)

OTHER PUBLICATIONS

Singh, J., et al., "A Combined Watermarking and Encryption Algorithm for Secure VoIP," XP009127189, Jan. 1, 2009, 7 pages.
(Continued)

*Primary Examiner* — Michael R Vaughn
(74) *Attorney, Agent, or Firm* — Conley Rose, P.C.

(57) ABSTRACT

A method and a corresponding terminal for an encrypted call, to resolve disadvantages of an encrypted call that is implemented relying on a key management center (KMC) and network reconstruction, and reduce costs. The method includes establishing, by a first terminal, a circuit switched call with a second terminal, determining, by the first terminal using the circuit switched call, a key for performing an encrypted call with the second terminal, and performing, by the first terminal, an encrypted call with the second terminal using the key.

20 Claims, 2 Drawing Sheets

(51) Int. Cl.
  *H04W 12/04* (2021.01)
  *H04L 12/50* (2006.01)
  *H04L 9/08* (2006.01)
  *H04L 9/32* (2006.01)
  *H04M 3/20* (2006.01)

(52) U.S. Cl.
  CPC ............ *H04L 63/06* (2013.01); *H04M 3/205* (2013.01); *H04W 12/001* (2019.01); *H04W 12/0401* (2019.01)

(56) References Cited

U.S. PATENT DOCUMENTS

| | | | |
|---|---|---|---|
| 7,747,021 B2 * | 6/2010 | Lindteigen ........ | H04L 29/06027 380/274 |
| 2001/0033613 A1 * | 10/2001 | Vitenberg ............. | H04L 5/0046 375/222 |
| 2005/0163316 A1 | 7/2005 | Wing | |
| 2006/0269065 A1 * | 11/2006 | Lindteigen ........ | H04L 29/06027 380/270 |
| 2006/0281480 A1 | 12/2006 | Klug et al. | |
| 2010/0128875 A1 * | 5/2010 | Rosini ................. | H04L 63/0442 380/257 |
| 2011/0002296 A1 * | 1/2011 | Agnoni ............... | H04W 88/181 370/331 |
| 2012/0269346 A1 * | 10/2012 | Best .................... | H04L 63/0457 380/270 |
| 2013/0108044 A1 * | 5/2013 | Galwas ............... | H04W 12/001 380/257 |
| 2014/0208094 A1 * | 7/2014 | Rajsic ................. | H04L 63/0428 713/152 |
| 2016/0315762 A1 | 10/2016 | Moon et al. | |

FOREIGN PATENT DOCUMENTS

| | | |
|---|---|---|
| CN | 101268644 A | 9/2008 |
| CN | 101309281 A | 11/2008 |
| CN | 102307295 A | 1/2012 |
| CN | 103987032 A | 8/2014 |
| CN | 104581714 A | 4/2015 |
| CN | 103002406 B | 6/2016 |
| KR | 20150069982 A | 6/2015 |
| WO | 2006124326 A1 | 11/2006 |

OTHER PUBLICATIONS

Foreign Communication From A Counterpart Application, European Application No. 15902015.5, Extended European Search Report dated Jul. 17, 2018, 10 pages.
Machine Translation and Abstract of Chinese Publication No. CN101309281, Nov. 19, 2008, 18 pages.
Machine Translation and Abstract of Chinese Publication No. CN102307295, Jan. 4, 2012, 27 pages.
Machine Translation and Abstract of Chinese Publication No. CN104581714, Apr. 29, 2015, 11 pages.
Foreign Communication From A Counterpart Application, PCT Application No. PCT/CN2015/088235, English Translation of International Search Report dated May 24, 2016, 2 pages.
Machine Translation and Abstract of Chinese Publication No. CN103002406, Jun. 15, 2016, 12 pages.
Machine Translation and Abstract of Chinese Publication No. CN101014159, Aug. 8, 2007, 17 pages.
Machine Translation and Abstract of Chinese Publication No. CN101183935, May 21, 2008, 20 pages.
Machine Translation and Abstract of Chinese Publication No. CN103987032, Aug. 13, 2014, 7 pages.
Foreign Communication From A Counterpart Application, Chinese Application No. 201580029703.X, Chinese Office Action dated Apr. 19, 2019, 10 pages.
Bernstein, D., "Protecting communications against forgery," XP055575774, Algorithmic Number Theory, vol. 44, May 1, 2008, 15 pages.
Foreign Communication From A Counterpart Application, European Application No. 15902015.5, European Office Action dated Apr. 5, 2019, 10 pages.

* cited by examiner

METHOD FOR ENCRYPTED CALL AND TERMINAL

CROSS-REFERENCE TO RELATED APPLICATION

This application is a U.S. National Stage of International Patent Application No. PCT/CN2015/088235 filed on Aug. 27, 2015, which is hereby incorporated by reference in its entirety.

TECHNICAL FIELD

The present disclosure relates to the field of terminals, and in particular to a method for an encrypted call, and a terminal.

BACKGROUND

Continuous development and popularization of communications technologies provide increasingly more convenience to people's work and life. However, at the same time, the communications technologies also cause some trouble to people. For example, personal information thieveries occur from time to time, and some even lead to serious cases. Information theft approaches include theft of personal data, network information, telephone information, and the like.

To avoid telephone hacking and ensure information security in telephone communication, an encrypted call terminal, such as an encrypted call mobile phone, appears on the market. An encryption module is embedded in the mobile phone, and the encryption module generates a key and performs decryption for each call. After establishing a circuit switched call, a first phone set and a second phone set separately register with a key management center (KMC) server using a short data burst (SDB), and obtain a key, and perform speech encryption using the obtained key.

However, in a process from obtaining the key by the first phone set and the second phone set to the speech encryption, the KMC needs to be deployed and network reconstruction needs to be performed. Expansibility compatibility is limited, and costs are high.

SUMMARY

The present disclosure discloses a method for an encrypted call, and a terminal to resolve disadvantages of an encrypted call that is implemented relying on a KMC and network reconstruction, and reduce costs.

A first aspect of the present disclosure provides a method for an encrypted call, including establishing, by a first terminal, a circuit switched call with a second terminal, determining, by the first terminal using the circuit switched call, a key for performing an encrypted call with the second terminal, and performing, by the first terminal, an encrypted call with the second terminal using the key.

Unlike other approaches, a key for performing an encrypted call between a first terminal and a second terminal is not allocated by a KMC, but is determined by the first terminal using a circuit switched call with the second terminal. Therefore, provision of the key does not need to rely on the KMC. Further, when provision of the key relies on the KMC, a special reconstructed network is needed to implement an encrypted call. However, in the present disclosure, network reconstruction is not needed, and the encrypted call may be supported using an existing network such that costs for KMC deployment and network reconstruction are greatly reduced.

According to the first aspect, in a first possible implementation manner, after establishing, by a first terminal, a circuit switched call with a second terminal, the method further includes generating, by the first terminal, at least one first synchronization frame according to a synchronization sequence preset by the first terminal and a current encoding rate of the first terminal, and sending, by the first terminal, the at least one first synchronization frame as a pseudo speech frame to the second terminal using the circuit switched call.

Unlike the other approaches, the first terminal and the second terminal preset a synchronization sequence. Further, the first terminal generates at least one first synchronization frame according to the synchronization sequence and a current encoding rate of the first terminal, and sends the at least one first synchronization frame to the second terminal. The first synchronization frame is sent as a pseudo speech frame using the circuit switched call. The first terminal sends the at least one first synchronization frame to the second terminal. After receiving the first synchronization frame, upon identifying at least one first synchronization frame, the second terminal may determine that a speech encoding transparent transmission feature of a network side has been activated. However, activation of the speech encoding transparent transmission feature of the network side is a basic condition for performing an encrypted call between the first terminal and the second terminal. Otherwise, the first terminal and the second terminal cannot perform an encrypted call.

According to the first aspect, in a second possible implementation manner, before determining, by the first terminal using the circuit switched call, a key for performing an encrypted call with the second terminal, the method further includes receiving, by the first terminal, at least one second synchronization frame sent by the second terminal, where the at least one second synchronization frame is generated by the second terminal according to a synchronization sequence preset by the second terminal and a current encoding rate of the second terminal, the at least one second synchronization frame is sent as a pseudo speech frame to the first terminal using the circuit switched call, and the second synchronization frame is used to trigger the first terminal to determine, using the circuit switched call, the key for performing an encrypted call with the second terminal.

Unlike the other approaches, the first terminal receives at least one second synchronization frame sent by the second terminal. The at least one second synchronization frame is sent as a pseudo speech frame using the circuit switched call. The first terminal may receive multiple second synchronization frames sent by the second terminal. However, upon identifying at least one second synchronization frame, the first terminal may determine that a speech encoding transparent transmission feature of a network side has been activated. However, activation of the speech encoding transparent transmission feature of the network side is a basic condition for performing an encrypted call between the first terminal and the second terminal. Otherwise, the first terminal and the second terminal cannot perform an encrypted call.

In some optional solutions, the second terminal may not send a second synchronization frame to the first terminal. For example, after receiving the first synchronization frame sent by the first terminal, the second terminal directly sends a key negotiation frame to the first terminal such that the first terminal determines a key for performing an encrypted call with the second terminal. Because the key negotiation frame has a predetermined indication sequence, and the indication sequence is used by the first terminal to identify that the speech encoding transparent transmission feature of the network side has been activated, the second terminal may not send the second synchronization frame to the first terminal in order to reduce consumption of network resources resulted from information exchange between the first terminal and the second terminal.

A second aspect of the present disclosure provides a terminal, including an establishing module configured to establish a circuit switched call with a second terminal, a determining module configured to determine, using the circuit switched call, a key for performing an encrypted call with the second terminal, and an encrypted call module configured to perform an encrypted call with the second terminal using the key.

Unlike the other approaches, a key for performing an encrypted call between a first terminal and a second terminal is not allocated by a KMC, but is determined by a determining module in the first terminal using a circuit switched call with the second terminal. Therefore, provision of a key does not need to rely on the KMC. Further, when provision of a key relies on the KMC, a special reconstructed network is needed to implement an encrypted call. However, in the present disclosure, network reconstruction is not needed, and the encrypted call may be supported using an existing network such that costs for KMC deployment and network reconstruction are greatly reduced.

A third aspect of the present disclosure provides a terminal, including a memory, a processor, a transmitter, and a receiver, where the memory is connected to the processor, the processor is connected to the transmitter, and the processor is connected to the receiver, and by invoking an operation instruction stored in the memory, the processor is configured to perform the steps of establishing, by the processor, a circuit switched call with a second terminal, determining, by the processor using the circuit switched call, a key for performing an encrypted call with the second terminal, and performing, by the processor, an encrypted call with the second terminal using the key.

Unlike the other approaches, a key for performing an encrypted call between a first terminal and a second terminal is not allocated by a KMC, but is determined, by a processor serving the first terminal, using a circuit switched call with the second terminal. Therefore, provision of the key does not need to rely on the KMC. Further, when provision of a key relies on the KMC, a special reconstructed network is needed to implement an encrypted call. However, in the present disclosure, network reconstruction is not needed, and the encrypted call may be supported using an existing network such that costs for KMC deployment and network reconstruction are greatly reduced.

DESCRIPTION OF EMBODIMENTS

The present disclosure discloses a method for an encrypted call and a terminal to resolve disadvantages of an encrypted call that is implemented relying on a KMC and network reconstruction, and reduce costs.

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

In the specification, claims, and accompanying drawings of the present disclosure, the terms "first," "second," "third," "fourth," and so on are intended to distinguish between different objects but do not indicate a particular order. In addition, the terms "including," "having," or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The technical solutions of the present disclosure are applied to any terminal, for example, a smartphone, an IPAD, and a personal computer, which is not limited herein.

Figure 1:
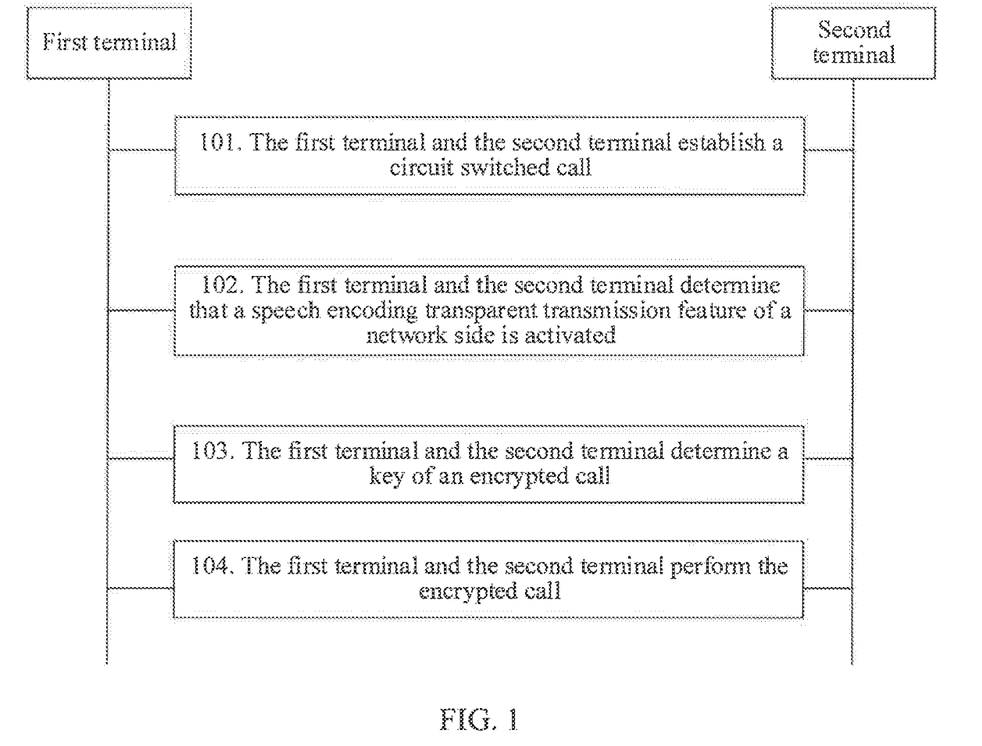
FIG. 1 is a schematic diagram of an embodiment of an encrypted call according to an embodiment of the present disclosure.

Referring to FIG. 1, FIG. 1 is an embodiment of a method for an encrypted call according to an embodiment of the present disclosure, mainly including establishing, by a first terminal and a second terminal, a circuit switched call, determining, by the first terminal and the second terminal, a key for an encrypted call after the first terminal and the second terminal determine that a speech encoding transparent transmission feature of a network side is activated, and finally, performing, by the first terminal and the second terminal, an encrypted call using the determined key. A specific process is as follows.

Step 101: A first terminal and a second terminal establish a circuit switched call.

The first terminal may be a calling terminal, or may be a called terminal. When the first terminal is a calling terminal, the second terminal is a called terminal accordingly. Conversely, when the second terminal is a calling terminal, the first terminal is a called terminal. This is not limited herein.

For example, the first terminal is a calling terminal, and the second terminal is a called terminal. The first terminal directly initiates an encrypted call to the second terminal. After receiving the encrypted call of the first terminal in a ringing manner, a mute manner, or the like, the second terminal answers the encrypted call of the first terminal such that the first terminal establishes a circuit switched call with the second terminal. Correspondingly, the second terminal also establishes the circuit switched call with the first terminal by answering the encrypted call of the first terminal. The circuit switched call is a bidirectional voice transmission channel established using a switch. Alternatively, the first terminal first establishes a circuit switched call with the second terminal using an ordinary call. Correspondingly, the second terminal also establishes the circuit switched call with the first terminal by answering the ordinary call of the first terminal. Further, the first terminal and the second terminal separately receive prompt information that the encrypted call is activated.

Step 102: The first terminal and the second terminal determine that a speech encoding transparent transmission feature of a network side is activated.

After the first terminal and the second terminal establish the circuit switched call, the first terminal generates at least one first synchronization frame according to a synchronization sequence preset by the first terminal and a current encoding rate of the first terminal, and the first terminal sends the at least one first synchronization frame as a pseudo speech frame to the second terminal using the circuit switched call.

Speech signal duration represented by one speech frame is about 20 milliseconds (ms) to balance a delay that is introduced when the first terminal sends the first synchronization frame and reliability of receiving the first synchronization frame by the second terminal. For example, generally, a maximum of five first synchronization frames are sent, and the first synchronization frame includes multiple repeated synchronization sequences, for example, (0001100110000100, 0001100110000100 . . . ). In addition, the last sequence may be truncated from the tail. A second synchronization frame also includes multiple repeated synchronization sequences. The second synchronization frame is similar to the first synchronization frame, and details are not described herein again.

Unlike the other approaches, the first terminal and the second terminal preset a synchronization sequence. Further, the first terminal generates at least one first synchronization frame according to the synchronization sequence and a current encoding rate of the first terminal, and sends the at least one first synchronization frame to the second terminal. The first synchronization frame is sent as a pseudo speech frame using the circuit switched call. The first synchronization frame is not a speech frame generated by a speech encoder, but also has features of a speech frame. The first terminal sends the at least one first synchronization frame to the second terminal. After receiving the first synchronization frame, upon identifying at least one first synchronization frame, the second terminal may determine that a speech encoding transparent transmission feature of a network side has been activated. However, activation of the speech encoding transparent transmission feature of the network side is a basic condition for performing an encrypted call between the first terminal and the second terminal. Otherwise, the first terminal and the second terminal cannot perform an encrypted call.

Further, the first terminal receives at least one second synchronization frame sent by the second terminal. The at least one second synchronization frame is generated by the second terminal according to a synchronization sequence preset by the second terminal and a current encoding rate of the second terminal, the at least one second synchronization frame is sent as a pseudo speech frame to the first terminal using the circuit switched call, and the second synchronization frame is used to trigger the first terminal to determine, using the circuit switched call, the key for performing an encrypted call with the second terminal.

Unlike the other approaches, the first terminal receives at least one second synchronization frame sent by the second terminal. The at least one second synchronization frame is sent as a pseudo speech frame using the circuit switched call. The second synchronization frame is not a speech frame generated by a speech encoder, but also has features of a speech frame. The first terminal may receive multiple second synchronization frames sent by the second terminal. However, upon identifying at least one second synchronization frame, the first terminal may determine that a speech encoding transparent transmission feature of a network side has been activated. However, activation of the speech encoding transparent transmission feature of the network side is a basic condition for performing an encrypted call between the first terminal and the second terminal. Otherwise, the first terminal and the second terminal cannot perform an encrypted call.

It should be noted that, after the first terminal and the second terminal establish the circuit switched call, generation of the first synchronization frame by the first terminal and generation of the second synchronization frame by the second terminal may occur in any order, or may occur simultaneously. This may be determined according to actual conditions, and is not limited herein.

It should be noted that, sending of the first synchronization frame by the first terminal to the second terminal and sending of the second synchronization frame by the second terminal to the first terminal may occur in any order, or may occur simultaneously. This may be determined according to actual conditions, and is not limited herein.

In addition, the second terminal may directly send the second synchronization frame to the first terminal, may send the second synchronization frame to the first terminal after detecting the first synchronization frame of the first terminal, or may also determine whether to send the second synchronization frame according to a caller identification (ID) of the first terminal. This is not limited herein.

In actual application, the speech encoding transparent transmission feature of the network side may be a tandem free operation (TFO) feature or a Transcoder Free Operation (TrFO) feature. This is not limited herein. For example, after identifying at least one second synchronization frame sent by the second terminal, the first terminal may determine that a TFO feature or TrFO feature of a local network side of the first terminal is activated, that is, achieve a direct end-to-end speech frame.

Step 103: The first terminal and the second terminal determine a key for an encrypted call.

The first terminal generates a first public key and a first private key, and sends the first public key to the second terminal.

After the first terminal determines that the speech encoding transparent transmission feature of the local network side of the first terminal is activated, the first terminal generates a public-private key pair (that is, the first public key and the first private key) of the first terminal using a Diffie-Hellman (DH) (a key exchange protocol put forward by Diffie-Hellman) solution or an elliptic curve cryptography (ECC) algorithm and the DH are used in combination for key negotiation, and this key exchange algorithm is referred to as ECDH solution, and sends the generated public key to the second terminal. The objective is to enable the second terminal to generate, using a private key generated by the second terminal and the public key sent by the first terminal, the key for the encrypted call. The second terminal may generate a public-private key pair (that is, a second public key and a second private key) of the second terminal using the DH solution or the ECDH solution.

In actual application, the first terminal generates a shared key using the first private key, the second public key, and related parameters in the DH solution or in the ECDH solution, and then derives, using the shared key, a key for performing an encrypted call. Similarly, the second terminal generates a shared key according to the second private key, the first public key, and the related parameters in the DH solution or in the ECDH solution, and then derives, using the shared key, a key for performing an encrypted call. Finally, the key generated by the first terminal is the same as the key generated by the second terminal.

The first terminal generates a key negotiation frame according to the current encoding rate of the first terminal. The key negotiation frame carries the first public key and an indication sequence, and the key negotiation frame is sent as at least one pseudo speech frame to the second terminal using the circuit switched call.

In actual application, for example, the first public key generated by the first terminal using the DH solution and the second public key generated by the second terminal using the DH solution each have 128 bits. Using the first public key generated by the first terminal using the DH solution as an example, when the current encoding rate of the first terminal is greater than 144 bits per speech frame, the first 16 bits are used as indication information of the key negotiation frame of the first terminal, the following 128 bits are used as the first public key, and remaining bits are padded with bit "0" or "1". For example, a sequence of a key negotiation frame (148 bits) is (0010000000010101+128 bits (information of the first public key)+1111). When the current encoding rate of the first terminal is equal to 144 bits per speech frame, the first 16 bits are used as the indication information of the key negotiation frame of the first terminal, and the following 128 bits are used as the first public key. For example, a sequence of a key negotiation frame (144 bits) is (0010000000010101+128 bits (information of the first public key)). When the current encoding rate of the first terminal is less than 144 bits per speech frame, two speech frames need to be spliced to form one key negotiation frame. An indication sequence of the second speech frame has a negation relationship with an indication sequence of the first speech frame. For example, a sequence of a key negotiation frame (which is obtained by splicing two 80-bit speech frames) is (0010000000010101+64 bits (information of the first public key)), (1101111111101010+64 bits (information of the first public key)). Certainly, the information of the first public key may be placed at the tail of the key negotiation frame, may be placed in the front, or the like. A specific location of the information of the first public key in the key negotiation frame is not limited.

In actual application, for example, the first public key generated by the first terminal using the ECDH solution and the second public key generated by the second terminal using the ECDH solution each have 256 bits. Using the first public key that is generated by the first terminal using the ECDH solution as an example, the first public key is a coordinate point (x, y), where x and y each have 128 bits. When the current encoding rate of the first terminal is greater than 272 bits per speech frame, the first 16 bits are used as indication information of the key negotiation frame of the first terminal, the following 256 bits are used as the first public key (the front and rear parts are the value x and the value y respectively), and remaining bits are padded with bit "0" or "1". For example, a sequence of a key negotiation frame (276 bits) is (0010000000010101+256 bits (information of the first public key)+1111). When the current encoding rate of the first terminal is equal to 272 bits per speech frame, the first 16 bits are used as the indication information of the key negotiation frame of the first terminal, and the following 256 bits are used as the first public key (the front and rear parts are the value x and the value y respectively). For example, a sequence of a key negotiation frame (272 bits) is (0010000000010101+256 bits (information of the first public key)). When the current encoding rate of the first terminal is less than 272 bits per speech frame, two speech frames need to be spliced to form one key negotiation frame. An indication sequence of the second speech frame has a negation relationship with an indication sequence of the first speech frame. For example, a sequence of a key negotiation frame (which is obtained by splicing two 144-bit speech frames) is (0010000000010101+128 bits (information of the first public key)), (1101111111101010+128 bits (information of the first public key)). Certainly, the information of the first public key may be placed at the tail of the key negotiation frame, or may be placed in the front, or the like. A specific location of the information of the first public key in the key negotiation frame is not limited.

The first terminal receives a second public key, where the second public key is a public key generated by the second terminal.

The first terminal determines, using the first private key and the second public key, the key for performing an encrypted call with the second terminal.

It should be noted that, generation of the public-private key pair of the first terminal by the first terminal and generation of the public-private key pair of the second terminal by the second terminal have no particular order, and may occur simultaneously. This may be determined according to actual conditions, and is not limited herein.

It should be noted that, sending of the first public key by the first terminal to the second terminal and sending of the first public key by the second terminal to the first terminal have no particular order, and may occur simultaneously. This may be determined according to actual conditions, and is not limited herein.

It should be noted that, generation of the key by the first terminal and generation of the key by the second terminal have no particular order, and may occur simultaneously. This may be determined according to actual conditions, and is not limited herein. Finally, the key generated by the first terminal is the same as the key generated by the second terminal.

Step 104: The first terminal and the second terminal perform an encrypted call.

The first terminal generates at least one first encrypted frame using the key, and sends the at least one first encrypted key to the second terminal, where the first encrypted frame is at least one speech frame that is encrypted by the first terminal using an Advanced Encryption Standard (AES) symmetric encryption algorithm.

The first terminal encrypts, using the key according to the current encoding rate of the first terminal, a speech frame generated by a speech encoder of the first terminal to generate a first encrypted frame, or splices and then encrypts, using the key, at least two speech frames generated by a speech encoder of the first terminal to generate a first encrypted frame.

For example, when the current encoding rate of the first terminal is less than a predetermined encoding rate (for example, 6.4 kilobits per second (kbps)), two speech frames are spliced, 128-bit information is extracted according to given rules, the 128-bit information is encrypted, and then the encrypted 128-bit information is placed back to the position from which the information is extracted. The 128-bit information may be extracted in many manners, which are not limited herein. Alternatively, when the current encoding rate of the first terminal is equal to the predetermined encoding rate (for example, 6.4 kbps), a speech frame is directly encrypted. Alternatively, when the current encoding rate of the first terminal is greater than the predetermined encoding rate (for example, 6.4 kbps), grouping is performed first, for example, every 128 bits of information are grouped into one group, and then encryption is performed according to a uniform key, information less than 128 bits is not encrypted. In addition, a silence frame or a noise frame during the encrypted call between the first terminal and the second terminal does not need encryption and decryption processing.

The first terminal receives at least one second encrypted frame sent by the second terminal, where the second encrypted frame is at least one speech frame that is encrypted by the second terminal using the AES symmetric encryption algorithm.

The first terminal decrypts the at least one second encrypted frame using the AES symmetric encryption algorithm.

It may be understood that, when an encoding rate of the first terminal changes, the local network side of the first terminal adjusts the encoding rate of the first terminal, and instructs a local network side of the second terminal to adjust an encoding rate of the second terminal such that the encoding rate of the first terminal remains consistent with the encoding rate of the second terminal. As can be seen, unlike the other approaches, when the encoding rate changes due to network quality, the encoding rates of the first terminal and the second terminal may be adjusted at any time in the present disclosure in order to improve call quality between the first terminal and the second terminal.

With reference to the embodiment of the method for an encrypted call, the following provides a specific application scenario.

A user A uses a mobile phone a, and a user B uses a mobile phone b.

Firstly, a first type of establishment process of a circuit switched call includes that the user A initiates, using the mobile phone a, an encrypted call to the mobile phone b of the user B, and the user B receives the encrypted call using the mobile phone b in order to establish a circuit switched call between the mobile phone a and the mobile phone b. Alternatively, a second type of establishment process of a circuit switched call includes that the user A initiates, using the mobile phone a, an ordinary call to the mobile phone b of the user B, and the user B receives the ordinary call using the mobile phone b in order to establish a circuit switched call between the mobile phone a and the mobile phone b. When an encrypted call is activated, further, prompt information that the encrypted call is activated appears on screens of the mobile phone a and the mobile phone b. Further, the user A receives, using the mobile phone a, the prompt information that the encrypted call is activated, and the user B receives, using the mobile phone b, the prompt information that the encrypted call is activated.

Secondly, the mobile phone a and the mobile phone b, each generate a synchronization frame in the background. Further, so long as the mobile phone a and the mobile phone b, each identify one of the synchronization frames of the other party, the mobile phone a and the mobile phone b may determine each that a speech encoding transparent transmission feature of a local network side thereof is activated. Activation of a speech encoding transparent transmission feature of a network side is a basic condition for performing an encrypted call between the user A and the user B. Otherwise, the user A and the user B cannot perform an encrypted call.

Thirdly, the mobile a and the mobile b determine a key for performing an encrypted call between the user A and the user B. A specific process includes that the mobile phone a generates a key for an encrypted call using a private key generated by the mobile a and a public key sent by the mobile phone b and further with reference to some related parameters. For example, the related parameters are related parameters in a DH solution or in an ECDH solution, and are not limited herein. The mobile phone b generates a key for an encrypted call using a private key generated by the mobile phone b and a public key sent by the mobile phone a and further with reference to some related parameters. Finally, the key generated by the mobile phone a is the same as the key generated by the mobile phone b.

Finally, the user A and the user B perform an encrypted call using the key generated by the mobile phone a and the key generated by the mobile phone b. A specific process includes that the mobile phone a and the mobile phone b, each generate a key negotiation frame using the key, and perform encryption and decryption processing on the key negotiation frame.

For better implementing the foregoing related method in the embodiments of the present disclosure, the following further provides a related apparatus configured to coordinate with the foregoing method.

Figure 2:
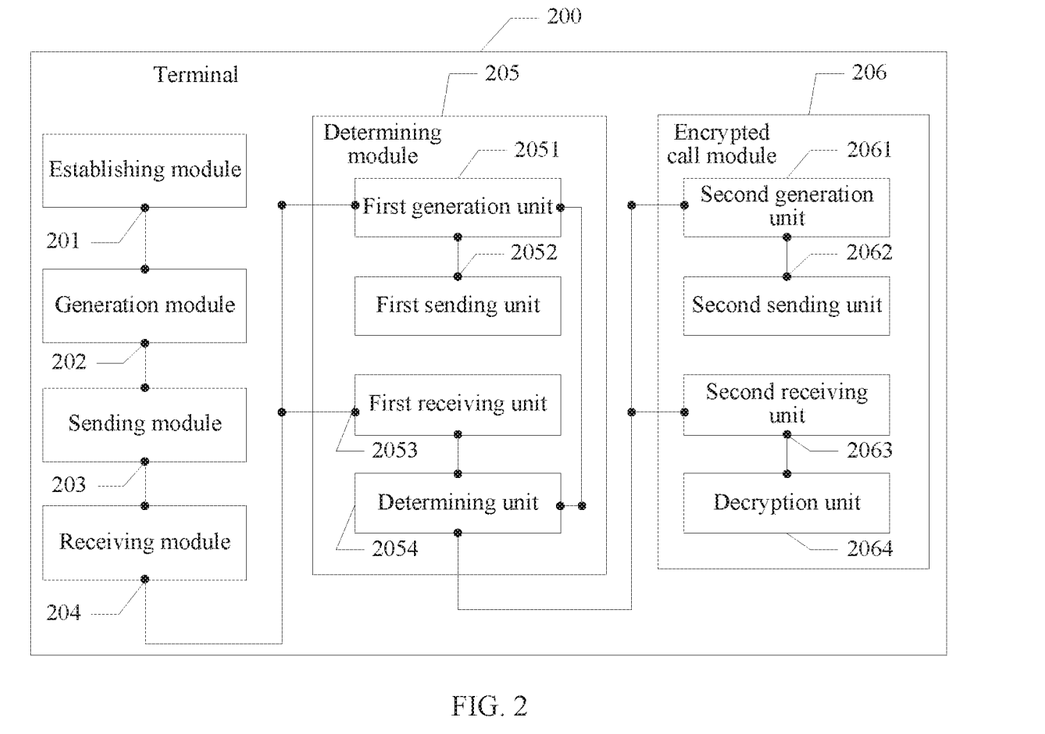
FIG. 2 is a schematic structural diagram of a terminal according to an embodiment of the present disclosure.

Referring to FIG. 2, an embodiment of a terminal 200 in the embodiments of the present disclosure includes an establishing module 201, a generation module 202, a sending module 203, a receiving module 204, a determining module 205, and an encrypted call module 206.

The establishing module 201 is configured to establish a circuit switched call with a second terminal.

The generation module 202 is configured to generate at least one first synchronization frame according to a synchronization sequence preset by the terminal 200 and a current encoding rate of the terminal 200 after the establishing module 201 establishes the circuit switched call with the second terminal.

The sending module 203 is configured to send the at least one first synchronization frame as a pseudo speech frame to the second terminal using the circuit switched call.

The receiving module 204 is configured to receive at least one second synchronization frame sent by the second terminal before the determining module 205 determines, using the circuit switched call, a key for performing an encrypted call with the second terminal, where the at least one second synchronization frame is generated by the second terminal according to a synchronization sequence preset by the second terminal and a current encoding rate of the second terminal, the at least one second synchronization frame is sent as a pseudo speech frame to the terminal 200 using the circuit switched call, and the second synchronization frame is used to trigger the determining module 205 to determine, using the circuit switched call, the key for performing an encrypted call with the second terminal.

The determining module 205 is configured to determine, using the circuit switched call, the key for performing an encrypted call with the second terminal.

The determining module 205 includes a first generation unit 2051, a first sending unit 2052, a first receiving unit 2053, and a determining unit 2054.

The first generation unit 2051 is configured to generate the first public key and a first private key.

The first sending unit 2052 is configured to send the first public key to the second terminal.

The first sending unit 2052 is further configured to generate a key negotiation frame according to the current encoding rate of the terminal 200, where the key negotiation frame carries the first public key and an indication sequence, and the key negotiation frame is sent as at least one pseudo speech frame to the second terminal using the circuit switched call.

The first receiving unit 2053 is configured to receive a second public key, where the second public key is a public key generated by the second terminal.

The determining unit 2054 is configured to determine, using the first private key and the second public key, the key for performing an encrypted call with the second terminal.

The encrypted call module 206 is configured to perform an encrypted call with the second terminal using the key.

The encrypted call module 206 includes a second generation unit 2061, a second sending unit 2062, a second receiving unit 2063, and a decryption unit 2064.

The second generation unit 2061 is configured to generate at least one first encrypted frame using the key.

The second generation unit 2061 is further configured to encrypt, using the key according to the current encoding rate of the terminal 200, a speech frame generated by a speech encoder of the terminal 200 to generate a first encrypted frame, or splice and then encrypt, using the key, at least two speech frames generated by a speech encoder of the terminal 200 to generate a first encrypted frame.

The second sending unit 2062 is configured to send the at least one first encrypted key to the second terminal, where the first encrypted frame is at least one speech frame that is encrypted by the terminal 200 using an AES symmetric encryption algorithm.

The second receiving unit 2063 is configured to receive at least one second encrypted frame sent by the second terminal, where the second encrypted frame is at least one speech frame that is encrypted by the second terminal using the AES symmetric encryption algorithm.

The decryption unit 2064 is configured to decrypt the at least one second encrypted frame using the AES symmetric encryption algorithm.

It should be noted that sending the first encrypted frame by the second sending unit 2062 and receiving the second encrypted frame by the second receiving unit 2063 have no particular order, and may be performed simultaneously. This is not limited herein.

Unlike the other approaches, a key for performing an encrypted call between the terminal 200 and a second terminal is not allocated by a KMC, but is determined by the determining module 205 in the terminal 200 using a circuit switched call with the second terminal. Therefore, provision of the key does not need to rely on the KMC. Further, when provision of a key relies on the KMC, a special reconstructed network is needed to implement an encrypted call. However, in the present disclosure, network reconstruction is not needed, and the encrypted call may be supported using an existing network such that costs for KMC deployment and network reconstruction are greatly reduced.

Figure 3:
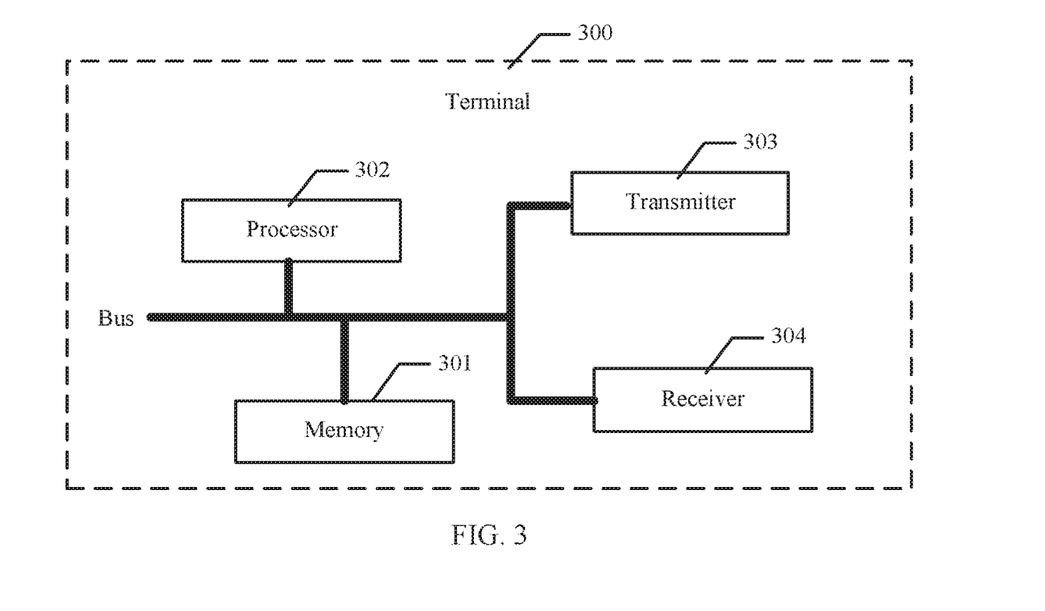
FIG. 3 is another schematic structural diagram of a terminal according to an embodiment of the present disclosure.

The embodiment shown in FIG. 2 describes a specific structure of a terminal from the perspective of functional modules. The following describes a terminal from the perspective of hardware with reference to an embodiment in FIG. 3. As shown in FIG. 3, a terminal 300 includes a memory 301, a processor 302, a transmitter 303, and a receiver 304, where the memory 301 is connected to the processor 302, the processor 302 is connected to the transmitter 303, and the processor 302 is connected to the receiver 304, where by invoking an operation instruction stored in the memory 301, the processor 302 is configured to perform the steps of establishing, by the processor 302, a circuit switched call with a second terminal, determining, by the processor 302 using the circuit switched call, a key for performing an encrypted call with the second terminal, and performing, by the processor 302, an encrypted call with the second terminal using the key.

After establishing, by the processor 302, a circuit switched call with a second terminal, the processor 302 is further configured to perform the step of generating, by the processor 302, at least one first synchronization frame according to a synchronization sequence preset by the terminal 300 and a current encoding rate of the terminal 300, and the transmitter 303 is configured to send the at least one first synchronization frame as a pseudo speech frame to the second terminal using the circuit switched call.

Before determining, by the processor 302 using the circuit switched call, a key for performing an encrypted call with the second terminal, the receiver 304 is configured to perform the step of receiving a second synchronization frame sent by the second terminal, where the at least one second synchronization frame is generated by the second terminal according to a synchronization sequence preset by the second terminal and a current encoding rate of the second terminal, the at least one second synchronization frame is sent as a pseudo speech frame to the receiver 304 using the circuit switched call, and the second synchronization frame is used to trigger the terminal 300 to determine, using the circuit switched call, the key for performing an encrypted call with the second terminal.

Determining, by the processor 302 using the circuit switched call, a key for performing an encrypted call with the second terminal includes generating, by the processor 302, a first public key and a first private key, where the first public key is sent to the second terminal using the transmitter 303, and determining, by the processor 302 using the first private key and a second public key, the key for performing an encrypted call with the second terminal when the receiver 304 receives the second public key, where the second public key is a public key generated by the second terminal.

Performing, by the processor 302, an encrypted call with the second terminal using the key includes generating, by the processor 302, at least one first encrypted frame using the key, and sending the first encrypted key to the second terminal using the transmitter 303, where the first encrypted frame is at least one speech frame that is encrypted by the processor 302 using an AES symmetric encryption algorithm, and decrypting, by the processor 302, at least one second encrypted frame using the AES symmetric encryption algorithm when the receiver 304 receives the at least one second encrypted frame sent by the second terminal, where the second encrypted frame is at least one speech frame that is encrypted by the second terminal using the AES symmetric encryption algorithm.

Generating, by the processor 302, at least one first encrypted frame using the key includes encrypting, by the processor 302 using the key according to the current encoding rate of the terminal 300, a speech frame generated by a speech encoder of the terminal 300 to generate a first encrypted frame, or splicing and then encrypting, using the key, at least two speech frames generated by a speech encoder of the terminal 300 to generate a first encrypted frame.

Unlike the other approaches, a key for performing an encrypted call between the terminal 300 and a second terminal is not allocated by a KMC, but is determined, by the processor 302 serving the terminal 300, using a circuit switched call with the second terminal. Therefore, provision of the key does not need to rely on the KMC. Further, when provision of a key relies on the KMC, a special reconstructed network is needed to implement an encrypted call. However, in the present disclosure, network reconstruction is not needed, and the encrypted call may be supported using an existing network such that costs for KMC deployment and network reconstruction are greatly reduced.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially or the part contributing to the other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The above describes a terminal, a server, and a user identification system and method provided in the present disclosure in detail. The principle and implementation of the present disclosure are described herein through specific examples. The description about the embodiments of the present disclosure is merely provided to help understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A method for an encrypted call, comprising:
    establishing, by a first terminal using a cellular network, a call with a second terminal using the cellular network;
    establishing, by the first terminal, a circuit switched call with the second terminal;
    generating, by the first terminal, a first synchronization frame according to a synchronization sequence preset by the first terminal and a current encoding rate of the first terminal;
    sending the first synchronization frame as a pseudo speech frame to the second terminal using the circuit switched call;
    receiving a key negotiation frame, wherein the key negotiation frame comprises a predetermined indication sequence;
    determining, by the first terminal using the circuit switched call, a key for performing the encrypted call with the second terminal; and
    performing, by the first terminal, the encrypted call with the second terminal using the key.

2. The method for the encrypted call of claim 1, wherein before determining the key for performing the encrypted call with the second terminal, the method further comprises receiving, by the first terminal, at least one second synchronization frame from the second terminal, wherein the at least one second synchronization frame is generated by the second terminal according to a synchronization sequence preset by the second terminal and a current encoding rate of the second terminal, wherein the at least one second synchronization frame is received as a pseudo speech frame to the first terminal using the circuit switched call, and wherein the second synchronization frame triggers the first terminal to determine, using the circuit switched call, the key for performing the encrypted call with the second terminal.

3. The method for the encrypted call of claim 2, wherein the first terminal, after identifying at least one second synchronization frame received from the second terminal, activates a tandem free operation (TFO) feature.

4. The method for the encrypted call of claim 2, wherein the first terminal, after identifying at least one second synchronization frame received from the second terminal, activates a transcoder free operation (TrFO) feature.

5. The method for the encrypted call of claim 1, wherein determining the key for performing the encrypted call with the second terminal comprises:
    generating, by the first terminal, a first public key and a first private key;
    sending, by the first terminal, the first public key to the second terminal;
    receiving, by the first terminal, a second public key, wherein the second public key comprises a public key generated by the second terminal; and
    determining, by the first terminal using the first private key and the second public key, the key for performing the encrypted call with the second terminal.

6. The method for the encrypted call of claim 5, wherein sending the first public key to the second terminal comprises:
    generating, by the first terminal, a key negotiation frame according to the current encoding rate of the first terminal, wherein the key negotiation frame carries the first public key and an indication sequence; and sending, by the first terminal, the key negotiation frame as at least one pseudo speech frame to the second terminal using the circuit switched call.

7. The method for the encrypted call of claim 1, wherein generating the at least one first encrypted frame using the key comprises splicing and then encrypting, using the key, at least two speech frames generated by a speech encoder of the first terminal to generate a first encrypted frame.

8. The method for the encrypted call of claim 1, wherein performing the encrypted call with the second terminal using the key comprises:
generating, by the first terminal, at least one first encrypted frame using the key;
sending, by the first terminal, the at least one first encrypted frame to the second terminal, wherein the at least one first encrypted frame comprises at least one speech frame encrypted by the first terminal using an Advanced Encryption Standard (AES) symmetric encryption algorithm;
receiving, by the first terminal, at least one second encrypted frame from the second terminal, wherein the at least one second encrypted frame comprises at least one speech frame encrypted by the second terminal using the AES symmetric encryption algorithm; and
decrypting, by the first terminal, the at least one second encrypted frame using the AES symmetric encryption algorithm.

9. The method for the encrypted call of claim 8, wherein generating the at least one first encrypted frame using the key comprises encrypting, by the first terminal using the key according to a current encoding rate of the first terminal, a speech frame generated by a speech encoder of the first terminal to generate a first encrypted frame.

10. The method for the encrypted call of claim 1, wherein determining the key for performing the encrypted call with the second terminal comprises using an Elliptic-Curve Diffie-Hellman (ECDH) algorithm.

11. A first terminal, comprising:
a memory configured to store an operation instruction;
a transmitter coupled to the memory;
a receiver coupled to the memory and the transmitter; and
a processor coupled to the memory, the transmitter, and the receiver, wherein the operation instruction stored in the memory causes the processor to be configured to:
establish a call with a second terminal, wherein the call is established using a cellular network accessed by the first terminal and the second terminal;
establish a circuit switched call with the second terminal;
generate a first synchronization frame according to a synchronization sequence preset by the first terminal and a current encoding rate of the first terminal;
send the first synchronization frame as a pseudo speech frame to the second terminal using the circuit switched call;
receive a key negotiation frame, wherein the key negotiation frame comprises a predetermined indication sequence;
determine, using the circuit switched call, a key for performing an encrypted call with the second terminal; and
perform the encrypted call with the second terminal using the key.

12. The first terminal of claim 11, wherein before determining the key for performing the encrypted call with the second terminal, the receiver is configured to receive at least one second synchronization frame from the second terminal, wherein the at least one second synchronization frame is generated by the second terminal according to a synchronization sequence preset by the second terminal and a current encoding rate of the second terminal, wherein the at least one second synchronization frame is received as a pseudo speech frame to the receiver using the circuit switched call, and wherein the second synchronization frame triggers the first terminal to determine, using the circuit switched call, the key for performing the encrypted call with the second terminal.

13. The first terminal of claim 12, wherein the first terminal, after identifying at least one second synchronization frame received from the second terminal, activates a tandem free operation (TFO) feature.

14. The first terminal of claim 12, wherein the first terminal, after identifying at least one second synchronization frame received from the second terminal, activates a transcoder free operation (TrFO) feature.

15. The first terminal of claim 11, wherein when determining the key for performing the encrypted call with the second terminal, the operation instruction further causes the processor to be configured to:
generate a first public key and a first private key;
send, using the transmitter, the first public key to the second terminal; and
determine, using the first private key and a second public key, the key for performing the encrypted call with the second terminal when the receiver receives the second public key, wherein the second public key comprises a public key generated by the second terminal.

16. The first terminal of claim 11, wherein when performing the encrypted call with the second terminal using the key, the operation instruction further causes the processor to be configured to:
generate at least one first encrypted frame using the key;
send the at least one first encrypted frame to the second terminal using the transmitter, wherein the at least one first encrypted frame comprises at least one speech frame encrypted by the processor using an Advanced Encryption Standard (AES) symmetric encryption algorithm; and
decrypt at least one second encrypted frame using the AES symmetric encryption algorithm when the receiver receives the at least one second encrypted frame from the second terminal, wherein the second encrypted frame comprises at least one speech frame encrypted by the second terminal using the AES symmetric encryption algorithm.

17. The first terminal of claim 16, wherein when generating the at least one first encrypted frame using the key, the operation instruction further causes the processor to be configured to splice and then encrypt, using the key, at least two speech frames generated by a speech encoder of the first terminal to generate a first encrypted frame.

18. The first terminal of claim 16, wherein when generating the at least one first encrypted frame using the key, the operation instruction further causes the processor to be configured to encrypt, using the key according to a current encoding rate of the first terminal, a speech frame generated by a speech encoder of the first terminal to generate a first encrypted frame.

19. The first terminal of claim 11, wherein determining the key for performing the encrypted call with the second terminal comprises using an Elliptic-Curve Diffie-Hellman (ECDH) algorithm.

20. A computer program product comprising instructions stored on a non-transitory medium and that, when executed by a processor, cause a first terminal to be configured to:
    establish a call with a second terminal, wherein the call is established using a cellular network accessed by the first terminal and the second terminal;
    establish a circuit switched call with the second terminal;
    generate a first synchronization frame according to a synchronization sequence preset by the first terminal and a current encoding rate of the first terminal;
    send the first synchronization frame as a pseudo speech frame to the second terminal using the circuit switched call;
    receive a key negotiation frame, wherein the key negotiation frame comprises a predetermined indication sequence;
    determine, using the circuit switched call, a key for performing an encrypted call with the second terminal; and
    perform the encrypted call with the second terminal using the key.

\* \* \* \* \*